UNITED STATES PATENT OFFICE.

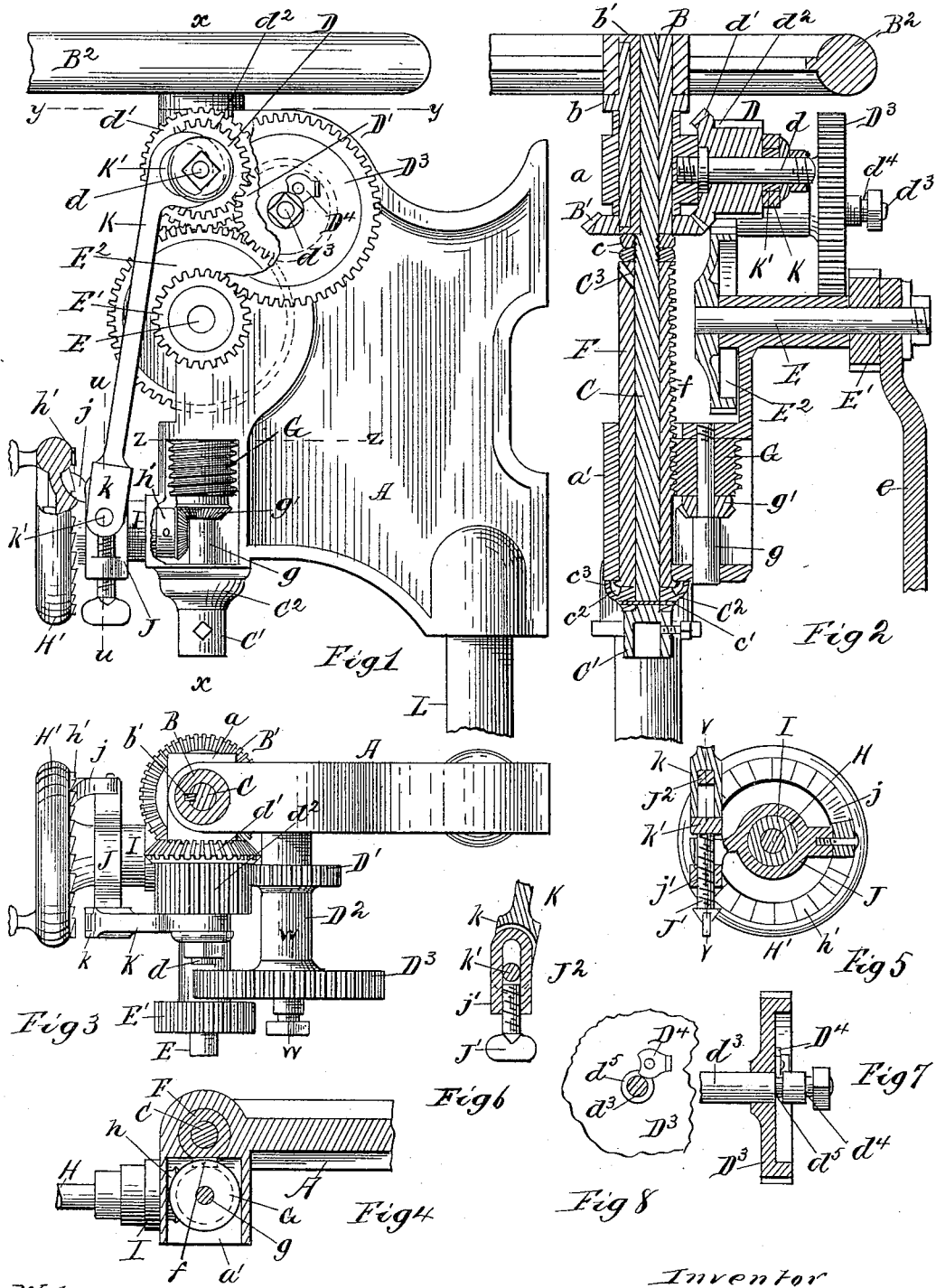

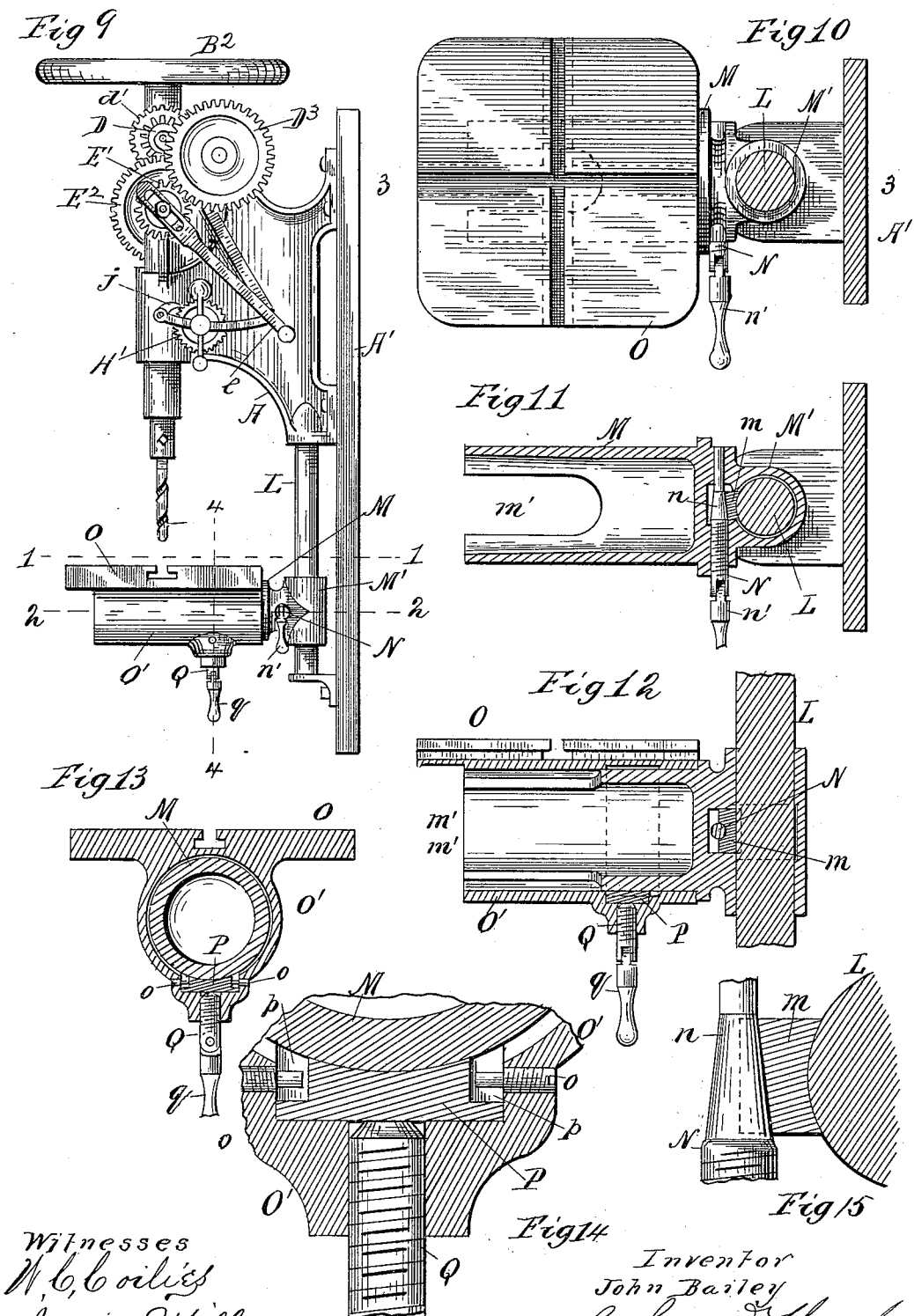

JOHN BAILEY, OF CARPENTERSVILLE, ILLINOIS, ASSIGNOR TO THE ILLINOIS IRON AND BOLT COMPANY, OF SAME PLACE.

DRILLING-MACHINE.

SPECIFICATION forming part of Letters Patent No. 366,366, dated July 12, 1887.

Application filed September 16, 1886. Serial No. 213,734. (No model.)

*To all whom it may concern:*

Be it known that I, JOHN BAILEY, a citizen of the United States, and residing at Carpentersville, in the county of Kane and State of Illinois, have invented a certain new and useful Improvement in Drills, which is fully set forth in the following specification, reference being had to the accompanying drawings, in which—
Figure 1 is a side elevation of a drill embodying my invention; Fig. 2, a sectional view of the same, taken on the line $x\,x$ of Fig. 1; Fig. 3, a plan section taken on the line $y\,y$ of Fig. 1; Fig. 4, a detail plan section taken on the line $z\,z$ of Fig. 1; Fig. 5, a detail plan view taken on the line $u\,u$ of Fig. 1; Fig. 6, a detail sectional view taken on the line $v\,v$ of Fig. 5; Fig. 7, a detail sectional view taken on the line $w\,w$ of Fig. 3; Fig. 8, a detail elevation of the construction, shown in Fig. 7; Fig. 9, an elevation of the drill and its work-holding table, a modified form of drill mechanism being shown; Fig. 10, a plan section taken on the line 1 1 of Fig. 9; Fig. 11, a similar plan section taken on the line 2 2 of Fig. 9; Fig. 12, a sectional view taken on the line 3 3 of Fig. 10; Fig. 13, a sectional view taken on the line 4 4 of Fig. 9; Fig. 14, a detail view of a portion of Fig. 13, enlarged; and Fig. 15, a detail view of a portion of Fig. 11, enlarged.

Like letters refer to like parts in all the figures of the drawings.

My invention relates to drills, and has for its object to produce an improved mechanism for operating the drill proper or drill-tool, and also an improved table for holding the work to be operated upon; and it consists in certain novel features, which I will now proceed to describe, and will then particularly point out in the claims.

In the drawings, A represents the supporting head or frame for the drill-operating mechanism, which is shown in the present instance as secured to a suitable base-board, A'. The supporting-frame A is provided with an upper bearing, $a$, and a lower bearing, $a'$, in the former of which is mounted a revoluble sleeve, B, provided with a collar, $b$, above the said bearing and with a bevel-gear, B', below the same, whereby any longitudinal motion of the sleeve in the bearing is prevented. A balance-wheel, $B^2$, of considerable weight, is attached to the projecting extremity of the sleeve B above the collar $b$, as shown.

C indicates the drill-spindle, which is connected to the sleeve B, within which it is arranged, by means of a spline-and groove connection, so that while it is capable of sliding longitudinally within the sleeve it is compelled to rotate with the same. This connection is shown in the present instance as effected by forming a groove in both the spindle and the sleeve, in which groove a spline or feather, $b'$, fits, having its extremities bent at right angles and seated in notches at the extremities of the sleeve B to hold it in position.

A short axis, $d$, is screwed into or otherwise secured to one side of the bearing $a$, and upon this is mounted a pinion, D, provided at its inner end with a bevel-gear, $d'$, to mesh with the gear B' on the lower end of the sleeve B. The cylindrical body of the pinion D is provided with a series of gear-teeth, $d^2$, of considerable length, with which gear teeth a pinion, D', mounted on a fixed axis, $d^3$, attached to the frame A, meshes. The pinion D' is not mounted directly upon the axis $d^3$, but is secured to a sleeve, $B^3$, mounted loosely on said axis and capable of being slid thereon endwise, said sleeve being provided at its outer end with a large pinion, $D^3$, about twice the diameter of the small pinion D'. This pinion has pivoted upon it a catch, $D^4$; and the axis $d^3$ is provided at its outer end with two circumferential grooves, $d^4\,d^5$, arranged at a distance apart about equal to the thickness of one of the pinions D' or $D^3$. The catch $D^4$ may be engaged with either one of these grooves, as desired, for the purposes hereinafter stated. This construction is shown more particularly in Figs. 7 and 8 of the drawings.

E represents the driving-shaft, which is shown in the present instance as operated by means of a suitable crank-handle, $e$, secured thereon, the said driving-shaft being provided, near its outer end, with a small pinion, E', and near its inner end with a large pinion, $E^2$, so arranged that the pinion D' may be caused to mesh with the pinion $E^2$, as shown; or by sliding the sleeve $D^2$ outward upon the axis $d^3$, the pinion D³ may be caused to mesh with the pinion E'. Owing to the length of the gear-teeth $d^2$ on the pinion D, the pinion D' will mesh with the said pinion D in either of its positions, so that when the crank-handle $e$ is turned the drill-spindle will be rotated through the train of gearing just described, in an obvious manner.

In order to feed the drill to its work, I have devised the following mechanism:

F indicates a sleeve mounted in the lower bearing, $a'$, of the frame A, surrounding the drill-spindle C, and held in position upon the same by means of one or more nuts, $c$, mounted upon a suitable thread on the spindle at the upper end of the said sleeve, these nuts serving, when screwed up, to force the sleeve F downward against the enlarged head C' at the lower end of the drill-spindle, so as to cause the drill spindle to move longitudinally with the sleeve. The sleeve F is prevented from rotating by means of a rack, $f$, formed upon one of its sides and extending outward through a suitable slot in the bearing $a'$, as shown more particularly in Fig. 4 of the drawings.

G indicates an endless screw or worm, which meshes with the rack $f$ on the sleeve F, the said screw being mounted on a short fixed shaft, $g$, in the frame A, as shown. The endless screw G is provided at its lower end with a bevel-pinion, $g'$, with which meshes a similar bevel-pinion, $h'$, attached to the inner end of a shaft, H, mounted in a suitable sleeve-bearing, I, in the frame A, and having on its outer extremity a wheel, H', by means of which said shaft may be rotated.

In case the machine is desired to be used without an automatic feed, the wheel H' will be an ordinary hand-wheel; but I have also provided an automatic feed, in which case the wheel H' is a ratchet-wheel, as well as a hand-wheel, being provided on its rear side with a series of ratchet-teeth, $h'$.

J indicates a vibrating lever, pivoted upon the sleeve I in the rear of the ratchet-wheel H', and provided at one end with a pawl, $j$, pivoted to it, as shown, and held in engagement with the ratchet-teeth $h'$ by gravity. To the other end of the vibrating lever J is attached the lower end of a pitman, K, the upper end of which embraces an eccentric, K', attached to the pinion D and mounted on the axis $d$. The connection between the pitman K and lever J is shown more particularly in Figs. 5 and 6 of the drawings, and consists of a yoke, J², mounted on the end of the lever J and provided with a screw, J', which passes through a suitably-threaded aperture in the bottom $j'$ of the said yoke, so that the said screw may be projected into the interior of the yoke to a greater or less extent, as desired. The lower extremity of the pitman K is forked, as shown at $k$, to embrace the yoke J², and is provided with a transverse pin, $k'$, arranged within the said yoke to connect it to the same.

Between the enlarged head C' of the drill-spindle and the lower end of the sleeve F is arranged an oil-cup, C². This oil-cup is preferably constructed of brass or some other anti-friction metal, and is secured to the spindle by means of a pin, $c'$, or in any other suitable manner. Its upper surface bears against the lower end of the sleeve F, near the outer edge of which it is provided with an oil-groove, $c^2$, the body of the cup being extended upward outside of the sleeve, forming a flange, $c^3$, surrounding the lower projecting portion of the same. The oil-cup C², being constructed of brass, as described, forms not only an oil-cup for lubricating the bearing at the lower end of the spindle, but also forms the anti-friction surface of the bearing itself. An oiling aperture, C³, at the top of the sleeve F, permits the application of a lubricant in such a manner as to lubricate the drill-spindle within the said sleeve, and the oil, after it passes downward between these two parts, will lubricate the bearing between the oil-cup C² and the lower end of the sleeve F, and, passing thence out into the groove $c^2$, will maintain a constant supply of lubricating material for this bearing. The flange $c^3$ prevents the oil from being thrown out of the groove by centrifugal force during the operating of the drill.

In Figs. 9 to 15 of the drawings I have shown my improved drill mechanism in connection with the work-holding table which I have devised. The external feeding mechanism is shown in a somewhat modified form in Fig. 9 of the drawings, being arranged on the side and differing somewhat in slight details, but being identical in its main features, and therefore needing no extended description. The work-holding table is mounted upon a cylindrical standard, L, secured to or formed in one piece with the supporting-frame A, and extending vertically downward from the same. Upon this standard is mounted a cylindrical arm, M, arranged horizontally at right angles to the standard L, and provided at its rear end with a vertical sleeve, M', through which the said standard passes. The said arm can thus be rotated around the said standard, so as to project radially therefrom at any desired angle, and may also be moved vertically thereon to any desired height, it being provided with a clamping device for securing it in position after adjustment. The clamping device which I prefer for this purpose, and which I have devised, consists of a clamping-block, $m$, mounted in a suitable recess opening into the interior of the sleeve M', the said clamping-block having its outer surface shaped to conform to the surface of the standard L, while its opposite surface is provided with a groove shaped to correspond with the conical surface $n$ of a screw, N, which passes through the arm at the rear of the block, as shown more particularly in Figs. 11, 12, and 15 of the drawings, the said arm being threaded to receive the screw, and the screw being provided with a pivoted handle, $n'$, by means of which it may be operated. The arm M is slotted at the top and bottom, as shown at $m'$, the said slots extending from the extremity in the arm toward the standard, as shown, for the purposes hereinafter stated.

The cylindrical arm is adapted to receive the work-holding table O, the said table being provided with a plane surface having T-shaped grooves crossing it at right angles, as shown, to receive the clamping-bolts, by means of which the work may be secured thereon in the usual manner. On its under side this table is provided with a cylindrical sleeve, O', which fits upon the cylindrical arm M, as shown, so that the said table may be adjusted radially upon the said arm into any desired position, it being provided with a clamping device for securing it after adjustment. The table may also be moved in and out upon the said arm in an obvious manner. The clamping device which I prefer, and which I have devised for the purposes of securing this table upon the arm, consists of a clamping-block, P, mounted in a suitable recess in the under side of the sleeve O', and retained in position therein by means of pins or screws $o$, the extremities of which project into slots or recesses $p$ in the ends of the block P, to permit the latter to move in the recess and to prevent it from dropping entirely out of the same when the table is removed from the arm. A screw, Q, passing up through a threaded aperture in the sleeve O, bears against the under side of the clamping-block P and serves to force the same against the arm M, with the curved surface of which its upper surface conforms. The screw Q is provided with a pivoted handle, $q$, by means of which it may be operated.

I will now proceed to describe the operation of my improved drill. The work to be operated upon is first secured upon the table O. The table is clamped in proper position upon the arm M by means of the screw Q, which forces the block P against the arm, and the arm is adjusted to the desired height upon an angle with the standard L, and secured thereon by means of the screw N, the conical portion $n$ of which operates upon the block $m$ to force the same against the standard and secure the whole, in an obvious manner. With work of certain kinds the table O is dispensed with, being removed entirely from the arm M. For instance, when it is desired to drill the tire of a wheel, the table being removed, the wheel is placed upon the said arm, the felly resting upon the surface of the arm, while the spoke extends down through the slots $m'$ in the arm. It will thus be seen that the arm permits the wheel to be adjusted thereon, so as to be in proper position for drilling.

The cylindrical form of the arm M prevents its marring the fellies of the wheel while being drilled, while at the same time it forms an arm to receive the table, when this latter is used, around which the said table may be radially as well as longitudinally adjusted.

The work being properly arranged upon the table, the drilling mechanism is next caused to operate. In the present instance the drill is shown as constructed for operation by manual power, through the medium of the crank-arm E; but it may of course be adapted for use in conjunction with any suitable motor, by connecting the motor to the shaft E. When the parts are in the position shown in the several figures of the drawings, the drill will be revolved at a high speed, the power being transmitted from the shaft E, through the large pinion $E^2$ thereon, to the small pinion D' on the sleeve $D^2$, and thence through pinion D and bevel-pinion B' on sleeve B to the drill-spindle C, to revolve the same. In case a slow revolution of the drill is desired, the catch $D^4$ is raised, and the sleeve $D^2$, with its pinion D' and $D^3$, moved outward on the axis $d^3$, until the pinion $D^3$ thereon meshes with the pinion E' on the shaft E. The parts are locked in this position by causing the catch $D^4$ to engage with the groove $d^4$, and the power will now be transmitted from the shaft E, through the small pinion E' thereon, to the large pinion $D^3$ on the sleeve $D^2$, and thence through the pinions D' and D, as before. It is obvious that the drill may then be caused to rotate at a fast or slow speed, as desired.

In case it is desired to feed the drill by hand, the pawl $j$ may be thrown back out of engagement with the ratchet-teeth $h'$ on the wheel H', and the latter operated by the handle attached thereto, when the pinion $h$ on the shaft H, meshing with the pinion $g'$ on the worm G, will cause this latter to revolve, and, by reason of its engagement with the rack $f$ on the sleeve F, force the same downward, thus feeding the drill to the work. In case the automatic feed is to be used, the pawl $j$ is thrown into engagement with the ratchet-teeth $h'$, when the reciprocation of the pitman K, through the medium of the cam K', will vibrate the lever J, and will cause an intermittent rotary movement of the ratchet-wheel H', which will be transmitted to the drill-spindle, through the mechanism described. This motion of the feed may be regulated independently of the speed of rotation of the drill, by means of the screw J', in the following manner: If the screw J' be projected up into the interior of the yoke $J^2$ until the pin $k'$ is held between the upper end of the yoke and the end of the screw without any longitudinal play within the yoke, it is obvious that the full motion of the pitman K will be imparted to the vibrating lever, and a maximum feed will be thus obtained. This feed may be decreased by lowering the screw J', so as to allow the pin $k'$ a greater or less play within the yoke, since it is obvious that the more play the pin has within the yoke the smaller will be the movement imparted to the vibrating lever J, and the feed will be correspondingly diminished until, when the screw J' is in its lowest position, the minimum feed will be obtained.

The horizontal balance-wheel $B^2$, located, as it is, upon the upper extremity of the sleeve B, runs upon a vertical bearing and causes the machine to move steadily and easily, without side friction. Moreover, it will be seen that, since the sleeve B, upon which the said balance-wheel B² is located, has its bearing in the main frame independent of the drill spindle, the said spindle is relieved of all the weight and friction of the balance-wheel, leaving the vertical movement of the said spindle unimpeded by the weight of the balance-wheel.

It is obvious that various modifications in the details of construction and arrangement of the parts may be made without departing from the principle of my invention, and I therefore do not wish to be understood as limiting myself strictly to the precise details of construction hereinbefore described and shown in the drawings.

Having thus described my invention, what I claim as new, and desire to secure by Letters Patent, is—

1. In a drill, the combination, with the drill-spindle and the sleeve splined thereon and provided with a bevel-gear, of an elongated pinion provided with a bevel-gear to mesh therewith, the driving-shaft provided with a large and a small pinion, and an intermediate shaft provided with a sleeve having a small and a large pinion, one of which meshes constantly with the elongated pinion, said sleeve being adjustable on its shaft, whereby its small pinion may be caused to mesh with the large pinion of the driving-shaft or its large pinion to mesh with the small pinion of the driving-shaft, substantially as and for the purposes specified.

2. In a drill, the combination, with the drill-spindle C and sleeve B splined thereon and having bevel-gear B', of the pinion D, having bevel-gear $d'$ and gear-teeth $d^2$, driving-shaft E, having small pinion E' and large pinion E², and the sleeve D², mounted loosely on a fixed axis and having small pinion D', meshing with the gear-teeth $d^2$, and large pinion D³, substantially as and for the purposes specified.

3. In a drill, the combination, with the pinion D and driving-shaft E, having pinions E' E², of the fixed axis $d^3$, having grooves $d^4$ $d^5$, and the sleeve D², mounted thereon, and having pinions D' and D³, the latter provided with a catch, D⁴, to engage with the grooves, substantially as and for the purposes specified.

4. In a drill, the combination, with the drill-spindle C, of the non-revoluble sleeve F, secured thereon and provided with rack $f$, the endless screw or worm G, meshing with said rack and provided with a bevel-pinion, $g'$, and the shaft H, provided with a bevel-pinion, $h'$, to mesh with said pinion, and having a wheel, H', to operate said shaft, substantially as and for the purposes specified.

5. In a drill, the combination, with the drill-spindle C, sleeve F, having rack $f$, worm G, meshing with said rack, and having bevel-pinion $g'$, and the shaft H, having bevel-pinion $h$ and ratchet-wheel H', of the vibrating lever J, having pawl $j$ at one end and the pitman K connected to the other end of said lever, and operated by a suitable eccentric in the driving-train, substantially as and for the purposes specified.

6. In a drill, the combination, with the shaft H, which operates the feeding mechanism, and the ratchet-wheel H', secured thereon, of the vibrating lever J, having pawl $j$, and yoke J², provided with adjusting-screw J' extending up into the same, and the pitman K, having forked lower end, $k$, with pin $k'$ passing through said yoke, substantially as and for the purposes specified.

7. In a drill, the combination, with the drill-spindle and the non-revoluble feeding-sleeve secured thereon, of an oil-cup secured on the spindle between its head and the lower end of the sleeve and provided with an oil-groove and an upwardly-extending peripheral flange, substantially as and for the purposes specified.

8. In a drill, the combination, with the sleeve F, of the drill-spindle C, having one or more nuts, $c$, upon its threaded portion above said sleeve, and having an enlarged head, C', below said sleeve, and an oil-cup, C², constructed of brass or other anti-friction material and arranged between said head and the lower end of the sleeve, thus forming a bearing therefor, substantially as and for the purposes specified.

9. The combination, with the cylindrical arm M, of the table O, having sleeve O' fitting upon said arm, and a clamping device to secure said table upon the arm, substantially as and for the purposes specified.

10. The combination, with the cylindrical arm M, of the table O, having sleeve O', the clamping-block P, slotted at $p$ to receive the retaining pins or screws $o$, and the adjusting-screw Q, bearing against the rear of said clamping-block, substantially as and for the purposes specified.

11. The combination, with the cylindrical standard L, of the arm M, having sleeve M', the clamping-block $m$, arranged to slide in a recess in said arm, and the adjusting-screw N, having conical portion $n$, bearing against the rear of the clamping-block, substantially as and for the purposes specified.

12. In a drill, the combination, with the cylindrical standard, of the cylindrical arm radially and vertically adjustable upon the said standard and the work-holding table radially and longitudinally adjustable upon the said arm, substantially as and for the purposes specified.

JOHN BAILEY.

Witnesses:
JOHN F. FIERKE,
C. E. GRIFFITH.